United States Patent [19]

Hofmann et al.

[11] 4,398,775

[45] Aug. 16, 1983

[54] JOURNAL BEARING WITH ONE AXIALLY DIVIDED INNER OR OUTER RING

[75] Inventors: Heinrich Hofmann; Günter Markfelder, both of Schweinfurt; Manfred Tröster, Bad Kissingen, all of Fed. Rep. of Germany

[73] Assignee: Fag Kugelfischer Georg Schäfer & Co., Schweinfurt, Fed. Rep. of Germany

[21] Appl. No.: 284,576

[22] Filed: Jul. 17, 1981

[30] Foreign Application Priority Data

Jul. 19, 1980 [DE] Fed. Rep. of Germany ....... 3027485

[51] Int. Cl.³ .................. F16C 33/40; F16C 33/78; F16C 33/60; F16C 33/48
[52] U.S. Cl. ............................. 308/201; 308/187.2; 308/196; 308/217
[58] Field of Search ............... 308/201, 196, 216, 217, 308/193, 195, 187.2

[56] References Cited

U.S. PATENT DOCUMENTS

| 3,709,572 | 1/1973 | Pethis ........................ 308/187.2 |
| 3,975,066 | 8/1976 | Hofmann et al. ................ 308/201 |
| 4,089,570 | 5/1978 | Markfelder et al. ............. 308/196 |
| 4,153,309 | 5/1979 | Markfelder et al. ............. 308/217 |
| 4,296,979 | 10/1981 | Hofmann et al. .............. 308/217 X |

FOREIGN PATENT DOCUMENTS

| 1768081 | 6/1958 | Fed. Rep. of Germany . |
| 2138283 | 5/1971 | France ........................ 308/201 |
| 2308013 | 4/1975 | France ........................ 308/201 |

Primary Examiner—Stuart S. Levy
Assistant Examiner—Thomas R. Hannon
Attorney, Agent, or Firm—Karl F. Ross

[57] ABSTRACT

A journal bearing for two relatively rotatable members is formed from two coaxial rings, one of them being axially divided into two mutually symmetrical halves with respective annular track surfaces each bounded only by an external shoulder while the other ring has two annular track surfaces separated by a pair of internal shoulders. Two sets of rotary bodies (balls or rollers) are confined by these shoulders between respective inner and outer track surfaces and are held spaced apart by a common annular cage with annular lips or groups of teeth snap-fitted into a pair of closely juxtaposed annular grooves near the shoulderless internal edges of the two ring halves whereby the entire assembly is held together when detached from the relatively rotatable members.

5 Claims, 3 Drawing Figures

JOURNAL BEARING WITH ONE AXIALLY DIVIDED INNER OR OUTER RING

FIELD OF THE INVENTION

Our present invention relates to a journal bearing of the type wherein two sets of rotary bodies (balls or rollers) are disposed on two axially spaced annular tracks between an inner and an outer ring, one of these rings being axially divided to facilitate the assembly of the parts.

BACKGROUND OF THE INVENTION

In several commonly owned U.S. patents, including Nos. 3,974,066, 4,138,170 and 4,153,309, a cage with pockets accommodating a set of such rotary bodies is disclosed as having a lip remote from these pockets which is snap-fitted into an annular groove of one of the bearing rings in order to keep these bodies in line with the track surfaces of the rings.

The splitting of one or both rings, e.g. as taught in commonly owned U.S. Pat. No. 4,089,570, simplifies the assembly of the rings, rotary bodies and associated cage or cages into a unit as well as the mounting of that unit between two coaxial members, such as a shaft and a housing, which are to be supported for relative rotation. Problems may arise, however, during storage of such units in disassembled form since their components may be accidentally interchanged and may then not properly interfit with the precision required for a smooth-running journal bearing. Moreover, the demounting of the unit is difficult when only one ring (e.g. the outer one, as is often the case) is readily accessible, especially when the track surfaces of that ring are bounded only by oppositely facing inner shoulders thereof but are outwardly shoulderless in order to simplify the task of machining the track boundaries. With oblique seat axes in an "O" or "X" mounting (see the aforementioned U.S. Pat. No. 3,975,066) the rotary bodies will be in contact during operation with only the internal shoulders of one ring and the external shoulders of the other ring; still, the provision of additional track boundaries without precision machining for the sake of holding the unit together would be detrimental since, on demounting, the bodies would come in contact with these rough boundaries and could be damaged thereby.

It has already been proposed (see French Pat. No. 2,138,283) to provide two sets of bearing balls with a common cage having two crenellated surfaces which define respective arrays of oppositely facing pockets for these bodies, the arrays being relatively staggered in peripheral direction for the purpose of saving space. The pockets form seats which are spherically curved over more than 180° whereby the balls are resiliently retained therein. Even with this arrangement, however, it is necessary to provide the axially split inner ring with internal and external track boundaries constituted by concave shoulders of appreciable height.

According to another earlier proposal (see German utility model No. 1,768,081) the two halves of the axially divided inner bearing ring are held together by a split ring of C-profile engaging in respective annular grooves of these halves between two sets of balls. When the unit is to be disassembled for any reason, e.g. for the replacement of a worn ball, the split ring must be removed by a special tool inasmuch as the balls are confined by external shoulders of the inner ring halves and internal and external shoulders of the unitary outer ring.

OBJECT OF THE INVENTION

The object of our present invention is to provide an improved journal bearing of the type referred to, with one axially divided ring and with only one shoulder per track on each ring, which remains assembled into a unit prior to mounting or upon demounting without the need for additional retaining means.

SUMMARY OF THE INVENTION

We realize this object, in accordance with our present invention, by providing the two sets of rotary bodies with a cage in the form of a uniform annular element of resilient material having two oppositely facing arrays of axially open pockets in which these bodies are received, that element further having projections which are snap-fitted into a pair of annular grooves provided inwardly of the track surfaces of the halves of the divided ring for holding these halves, the undivided other ring and the rotary bodies together in a state of separation from the structure for which they are intended, e.g. from a housing and a shaft to be supported thereby for relative rotation.

For the reasons noted above, the two halves of the divided ring are inwardly shoulderless while the undivided ring is outwardly shoulderless. At least as concerns the latter ring, however, the term "shoulderless" is not intended to exclude the provision of a rib or other projecting formation rising beyond the track surface at a location far enough from that surface to prevent any contact between such formation and the rotary bearing bodies either during normal operation or during mounting or demounting. In particular, a formation of this sort may serve to retain an annular dust shield spanning a gap between the two rings in the region of an external shoulder of the divided ring.

BRIEF DESCRIPTION OF THE DRAWING

The above and other features of our invention will now be described in detail, reference being made to the accompanying drawing in which.

SPECIFIC DESCRIPTION

Figure 1:
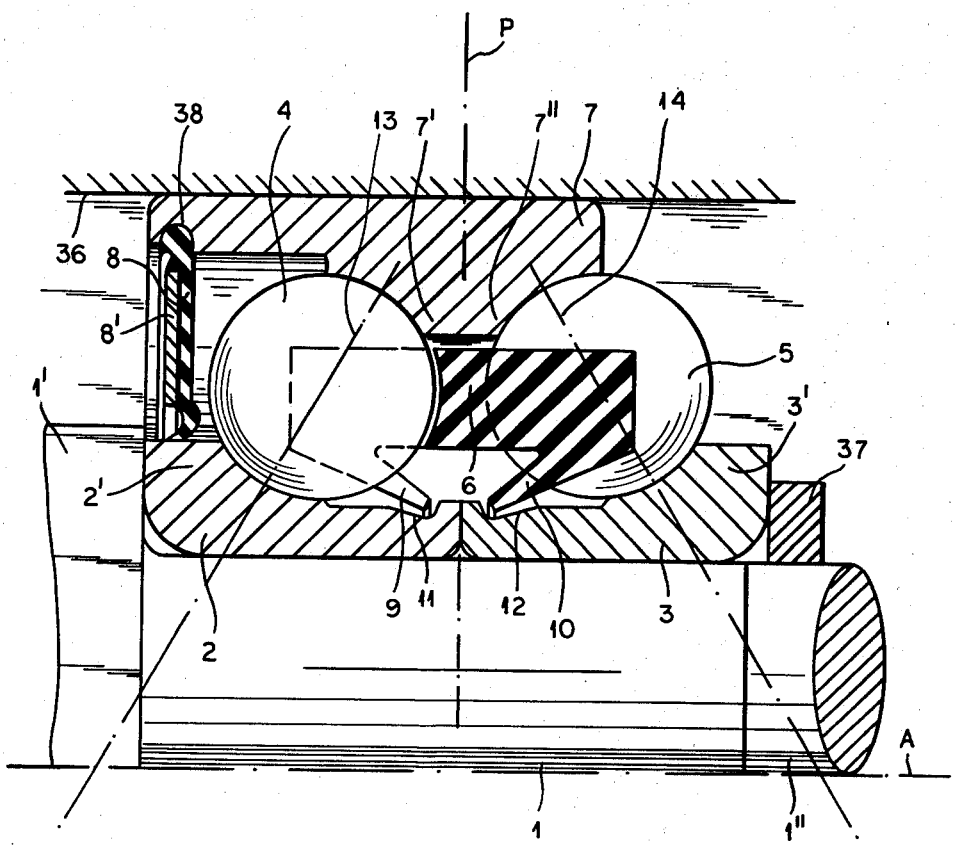
FIG. 1 is an axial sectional view of half a journal bearing embodying our invention.

In FIG. 1 we have shown two relatively rotatable members centered on a common axis A, namely a shaft 1 and a housing 36. Shaft 1 has a shoulder 1' and further has a part 1" provided with threads (not shown) for engagement with a nut 37 designed to hold in position a journal bearing according to our invention by clamping two mutually symmetrical halves 2 and 3 of an inner bearing ring therebetween. Ring halves 2 and 3 have track surfaces which are outwardly bounded by a pair of external annular shoulders 2' and 3' forming concave seating surfaces for two sets of balls 4 and 5 which are received in respective pockets of an annular cage 6 of elastic material. Other seating surfaces are formed by a pair of internal shoulders 7', 7" of an outer ring 7 hugging the inner periphery of housing 36. The track surfaces of inner ring 2, 3 are inwardly shoulderless while those of outer ring 7 are outwardly shoulderless; thus, the bearing unit of FIG. 1 can be readily assembled by inserting the two sets of balls 4, 5 into the respective pockets of cage 6, after that cage has been introduced into the outer ring 7, and thereafter bringing on the two halves 2, 3 of the inner ring from opposite sides. With nut 37 in position, nothing further need be done to keep the unit assembled; in operation, pressure is exerted upon the balls 4, 5 along respective oblique lines 13 and 14 passing through their centers, these lines defining so-called "O" mounting as discussed in commonly owned U.S. Pat. No. 3,975,066 already referred to.

Also shown in FIG. 1 is an annular dust shield 8 of elastic material, with a metallic inlay 8', which is mounted in a peripheral groove 38 of ring 7 and rests loosely on the shoulder 2' of ring half 2.

If it were necessary to demount the bearing of FIG. 1, after removal of nut 37, only the outer ring 7 would be conveniently accessible for a rightward shift relative to shaft 1. Such a shift would also entrain the right-hand half 3 of the inner ring through the set of balls 5 which in that case are loaded along lines 14, e.g. in the same direction as during operation. The left-hand ring half 2, however, would remain in place and could be extracted only after removal of ring half 3 and ring 7; thus, the unit would be disassembled and its components could become separated. Moreover, its subsequent reassembly may cause the dust shield 8 to be caught in the seat formed by shoulder 2' and to become crushed between that shoulder and the balls 4 when the latter are returned to their illustrated position together with ring 7; this would not only destroy the seal but also tend to mar the machined surfaces of ring half 2 and balls 4.

In order to obviate these drawbacks, our invention provides for the presence of a pair of annular grooves 11, 12 in ring halves 2, 3 close to their parting plane P, these grooves being of triangular cross-section and having frustoconical bottoms centered on axis A. Cage 6 has two groups of teeth 9, 10 converging from opposite sides towards parting plane P between the sets of balls 4 and 5 whose pockets are angularly offset from one another as known per se from the aforementioned French Pat. No. 2,138,283. The teeth 9, 10 are snap-fitted into the grooves 11, 12 and may be lodged therein with some play in the axial direction since they are not required to hold the ring halves 2 and 3 together when the bearing is installed, this being the task of nut 37 or equivalent locking means. Upon removal of the nut for the purpose of extracting the bearing, however, a rightward shift of outer ring 7 with consequent entrainment of the right-hand ring half 3 (through balls 5 as discussed above) will also cause the cage 6 to move in the same direction through the interaction of its teeth 10 with the steep edge of groove 12; this motion, in turn, will cause the teeth 9 to bear upon the steep edge of groove 11 of ring half 2 which thus will also be entrained with a little spacing from ring half 3 due to the tolerances between the teeth and the grooves. These tolerances, however, are not sufficient to allow for a relative axial shift of components 2 and 7 letting the seal 8 step off the shoulder 2' so that the danger of the seal being caught between that shoulder and the balls 4 upon reassembly is obviated. Even when entirely separated from shaft 1 and housing 36, unit 2-7 will remain assembled so that none of its components could be inadvertently mislaid.

Figure 2:
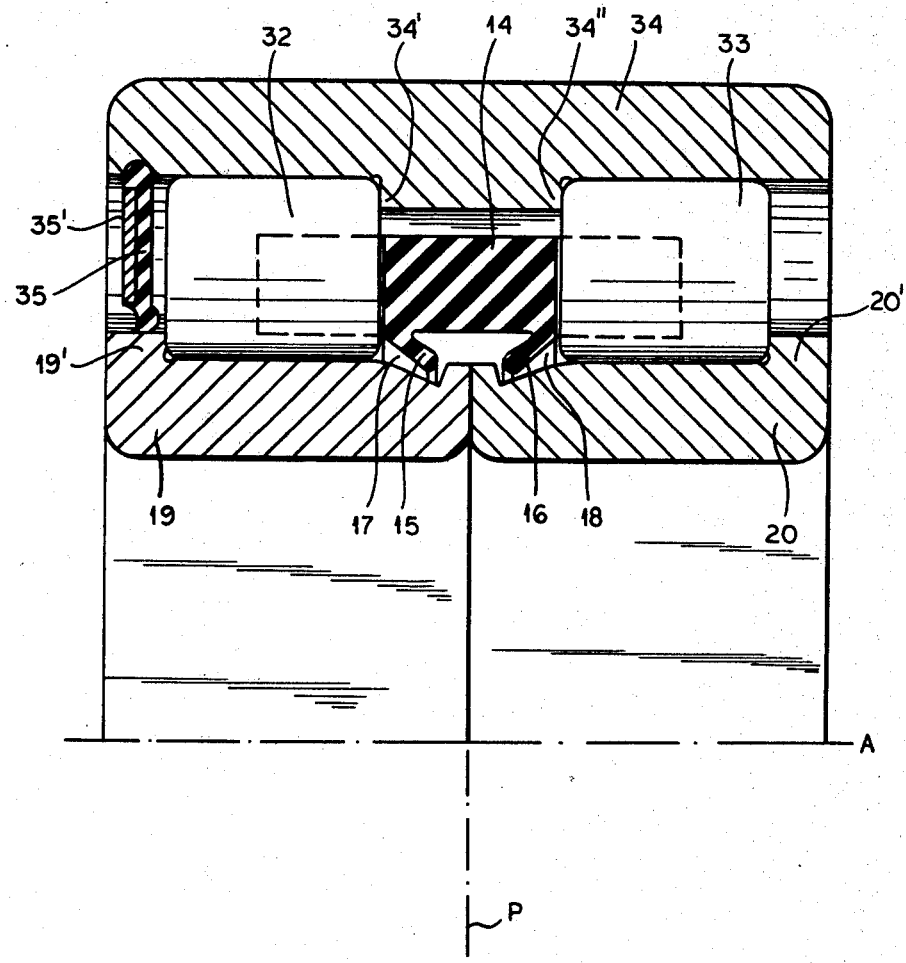
FIGS. 2 and 3 are views generally similar to that of FIG. 1, illustrating two modifications.

In FIG. 2 we have illustrated a generally similar journal bearing wherein, however, the balls 4, 5 of the preceding embodiment are replaced by rollers 32, 33 held between external shoulders 19', 20' of two halves 19, 20 of an inner ring and internal shoulders 34', 34" of a unitary outer ring 34. A cage 14 common to both sets of rollers again has two arrays of axially open pockets accommodating these rollers; in this instance, however, the pockets are not relatively offset. Cage 14 is formed with projections 15, 16 which, like the teeth 11, 12 of FIG. 1, converge toward parting plane P and engage in respective grooves 17, 18 of ring halves 19 and 20; in this instance, though, the projections are formed as continuous annular lips rather than angularly separated teeth. An annular dust seal 35, again received in a groove of the outer ring and provided with a metallic inlay 35', closes the left-hand gap between the two rings as in the preceding embodiment.

Figure 3:
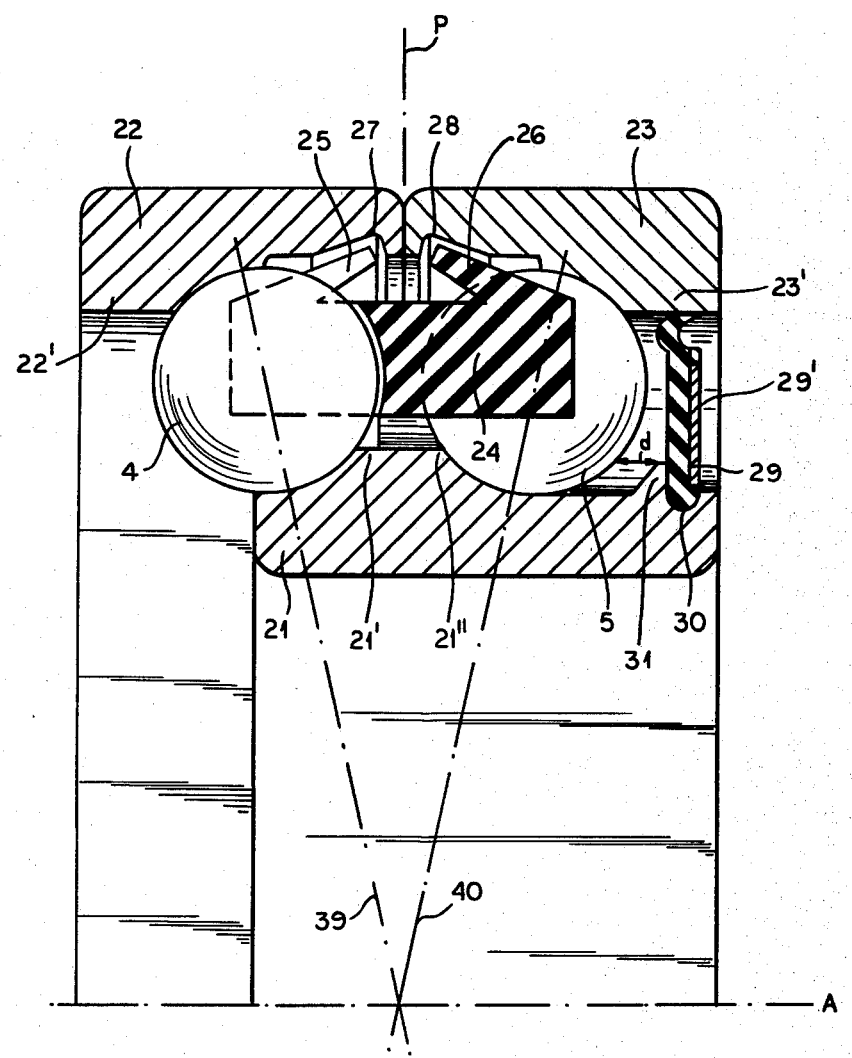

In FIG. 3, finally, there has been shown an inversion of the assembly of FIG. 1 with a unitary inner ring 21 forming internal shoulders 21', 21" and a divided outer ring whose halves 22, 23 form external shoulders 22', 23'. In this embodiment the rotary bodies are again shown as balls 4, 5 whose lines of pressure 39, 40, however, intersect on axis A to define a so-called "X" mounting as likewise discussed in the aforementioned U.S. Pat. No. 3,975,066. A common annular cage 24 of elastic material is similar to cage 6 of FIG. 1 and has two groups of relatively staggered teeth 25, 26 projecting into respective annular grooves 27, 28 near the parting plane P of the outer ring halves 22, 23. Ring 21 has a peripheral rib 31 which helps retain in position an annular dust seal 29 with inlay 29', the seal being held in a peripheral groove 30 adjacent rib 31. The distance d between rib 31 and balls 5 in operation (i.e. with ring halves 22 and 23 clamped to each other) exceeds the combined play of teeth 25, 26 and grooves, 27, 28 whereby the balls 5 will not contact the rib 31 in the demounted state of the unit in which these ring halves can limitedly separate. The rib, therefore, need not be machined with any degree of precision. By the same token, as in the preceding embodiments, the dust seal cannot move off the shoulder of the ring half normally engaged thereby during such limited separation.

Our invention can also be used with two sets of rollers, such as those shown in FIG. 2, disposed obliquely in an "O" or "X" mounting.

We claim:

1. In a journal bearing comprising an inner ring and an outer ring centered on a common axis, one of said rings being unitary and provided with a pair of oppositely facing first shoulders forming respective internal boundaries of two outwardly shoulderless first peripheral track surfaces, the other of said rings being axially divided into two substantially symmetrical halves and being provided with a pair of confronting second shoulders bracketing said first shoulders and forming respective external boundaries of two inwardly shoulderless second peripheral track surfaces concentric with said first track surfaces, two sets of rotary bodies confined by said first and second shoulders between said first and second track surfaces, and cage means engaging said rotary bodies of each set for holding them peripherally spaced apart, the improvement wherein said cage means comprises a unitary annular element of resilient material with two oppositely facing arrays of axially open pockets respectively receiving said sets of rotary bodies and with two annular groups of teeth disposed between said rotary bodies snap-fitted into a pair of annular grooves provided inwardly of said second track surfaces on said halves, said teeth of each group extending at an acute angle to said axis from circumferential spaces between adjacent rotary bodies of the respective set to one of said groove for holding said halves, said one of said rings and said rotary bodies together in a state of separation from other structure.

2. A journal bearing as defined in claim 1 wherein said rotary bodies are balls.

3. A journal bearing as defined in claim 2 wherein one set of balls and group of teeth is angularly offset from the other set of balls and group of teeth.

4. A journal bearing as defined in claim 1, 2 or 3 wherein said teeth converge from opposite sides toward a parting plane of said halves, said grooves being of triangular cross-section with frustoconical bottoms centered on said axis.

5. A journal bearing as defined in claim 1, 2 or 3 further comprising an annular dust shield spanning a gap between said one of said rings and one of said second shoulders.

* * * * *